US007039612B1

(12) United States Patent
Cook

(10) Patent No.: US 7,039,612 B1
(45) Date of Patent: May 2, 2006

(54) INTRANET PLATFORM SYSTEM

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 665 days.

(21) Appl. No.: 09/656,511

(22) Filed: Sep. 7, 2000

(51) Int. Cl.
G06F 17/60 (2006.01)

(52) U.S. Cl. ............................ 705/50; 705/26; 705/35; 707/9; 707/10; 707/225; 713/200; 713/202

(58) Field of Classification Search ................. 705/51, 705/50, 26, 35; 709/200, 201, 202, 205, 709/217, 218, 219, 220, 221, 222, 225, 226, 709/229; 707/9, 10, 225; 713/200, 202

See application file for complete search history.

(56) References Cited

U.S. PATENT DOCUMENTS

| | | | | |
|---|---|---|---|---|
| 5,241,565 | A * | 8/1993 | Kloc et al. | 375/285 |
| 5,812,765 | A * | 9/1998 | Curtis | 395/200.3 |
| 5,889,952 | A * | 3/1999 | Hunnicutt et al. | 395/200.49 |
| 6,023,762 | A * | 2/2000 | Dean et al. | 713/193 |
| 6,044,403 | A * | 3/2000 | Gerszberg et al. | 709/225 |
| 6,061,346 | A * | 5/2000 | Nordman | 370/352 |
| 6,081,900 | A * | 6/2000 | Subramaniam et al. | 713/201 |
| 6,223,177 | B1 * | 4/2001 | Tatham et al. | 707/9 |
| 6,453,348 | B1 * | 9/2002 | Barnier et al. | 709/225 |
| 6,470,453 | B1 * | 10/2002 | Vilhuber | 713/201 |
| 6,766,373 | B1 * | 7/2004 | Beadle et al. | 709/227 |
| 6,799,177 | B1 * | 9/2004 | Fai et al. | 707/9 |
| 2001/0034758 | A1 * | 10/2001 | Kikinis | 709/203 |
| 2001/0054019 | A1 * | 12/2001 | de Fabrega | 705/35 |
| 2002/0026497 | A1 * | 2/2002 | Matsuda | 709/218 |
| 2002/0029350 | A1 * | 3/2002 | Cooper et al. | 713/200 |
| 2002/0046255 | A1 * | 4/2002 | Moore et al. | 709/218 |
| 2002/0161676 | A1 * | 10/2002 | Vadlamani | 705/30 |
| 2002/0188674 | A1 * | 12/2002 | Brown et al. | 709/203 |

FOREIGN PATENT DOCUMENTS

WO    WO 94/25913 A2 * 11/1994

OTHER PUBLICATIONS

Anonymous, "Crypotcard 2: CRYPTOCard Enables Companies and ISPs to Secure Intranet Access With Authentication Tokens at Much Lower, Costs", Dialog File 810:Business Wire, Jun. 29, 1998.*

Anonymous, Bull Announces Crypto Safe Smart Card for Encryption of User Idenfification, Authentication, Signature and Messages, Business Wire, Dialog File 610:Business Wire, Nov. 9, 1999.*

(Continued)

*Primary Examiner*—James P. Trammell
*Assistant Examiner*—Daniel L. Greene

(57) ABSTRACT

An intranet platform system that automatically configures and provides access to virtual intranet networks using intranet access cards. The intranet platform system comprises a processing system coupled to an interface system. The processing system is configured to process a request message for intranet access to determine if an intranet configuration exists, and if the intranet configuration exists, process the request message to connect a user who receives an intranet access card to the intranet configuration. If the intranet configuration does not exist, the processing system processes the request message to automatically create the intranet configuration and connect the user to the intranet configuration. The interface system is configured to receive the request message for the processing system.

24 Claims, 5 Drawing Sheets

OTHER PUBLICATIONS

Hibbard, Justin, "Software Improves Intranet Access, Security", Computerworld, vol. 30, No. 52, Dec. 23, 1996.*

Frook, John Evan, "Health Network Bets on Chip Cards", InternetWeek, p. 23, Dec. 22, 1997.*

* cited by examiner

INTRANET PLATFORM SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunication systems, and specifically, to an intranet platform system configured to provide virtual intranet services using intranet access cards.

2. Description of the Prior Art

Intranets are private networks that use Internet software and standards to provide Internet type services to individuals with access rights. However, unlike the Internet, outside users cannot access intranet applications. Security is built into these applications, such that only authorized users have access. An extranet is an intranet where access is extended from internal-only communications to sharing documents and information with external clients such as customers or other businesses. Web browsers are the primary user interface for intranet and extranet applications, providing access through access servers located locally, remotely or on the Internet. Companies typically use intranet and extranet services to provide a wide range of content information, database applications, email, project collaboration, and news groups for company employees and selected customers and/or other businesses.

Unfortunately, commercial firms that have intranets spend large sums of money to design, setup and maintain hardware and software required for intranet hosting. Additionally, hardware planning and maintenance staff must be hired to provide ongoing support and maintenance of the intranet systems.

SUMMARY OF THE INVENTION

The present invention advances the art by providing an intranet platform system that automatically configures and provides access to virtual intranet networks using intranet access cards. A first advantage of the present intranet platform system, is that it simplifies the creation of intranet services. A second advantage of the present intranet platform system, is that it provides businesses and individuals with intranet services without the need to hire hardware planning and maintenance staff. A third advantage of the present intranet platform system, is that it eliminates the selection, procuring, configuring, maintenance, depreciation, and retirement of equipment that is outside the scope of a business or individuals core competency. A fourth advantage of the present intranet platform system, is that it provides flexible intranet services for either a short or long term duration. A fifth advantage of the present intranet platform system, is the efficient allocation of network resources as a result of not performing the intranet configuration until the first time one of a group of intranet access cards is used to request the intranet services.

The present intranet platform system comprises a processing system coupled to an interface system. The processing system is configured to process a request message for intranet access to determine if an intranet configuration exists, and if the intranet configuration exists, process the request message to connect a user who receives an intranet access card to the intranet configuration. If the intranet configuration does not exist, the processing system processes the request message to automatically create the intranet configuration and connect the user to the intranet configuration.

The interface system is configured to receive the request message for access to the intranet configuration from the user who receives the intranet access card. The intranet access cards provide access information for an intranet configuration. The intranet configuration could include services that are pre-packaged or could include custom services selected by the cardholder.

In the context of the present invention an intranet configuration is a private intranet network reserved for use by people who have been given the authority and access information necessary to use the network. An intranet according to the present invention might or might not use Internet software and circuits and could also incorporate extranet features to provide information to both internal and external members. Also in the context of the present invention, the first, second, third, fourth, etc. connotations used to reference the messages, the calls, the call handling, and message processing are used for the purpose of differentiating between different messages, calls, call handling, and message processing, and are not used to indicate a message sequence, call sequence or processing sequence.

DETAILED DESCRIPTION OF THE PREFERRED EMBODIMENT

Figure 1:
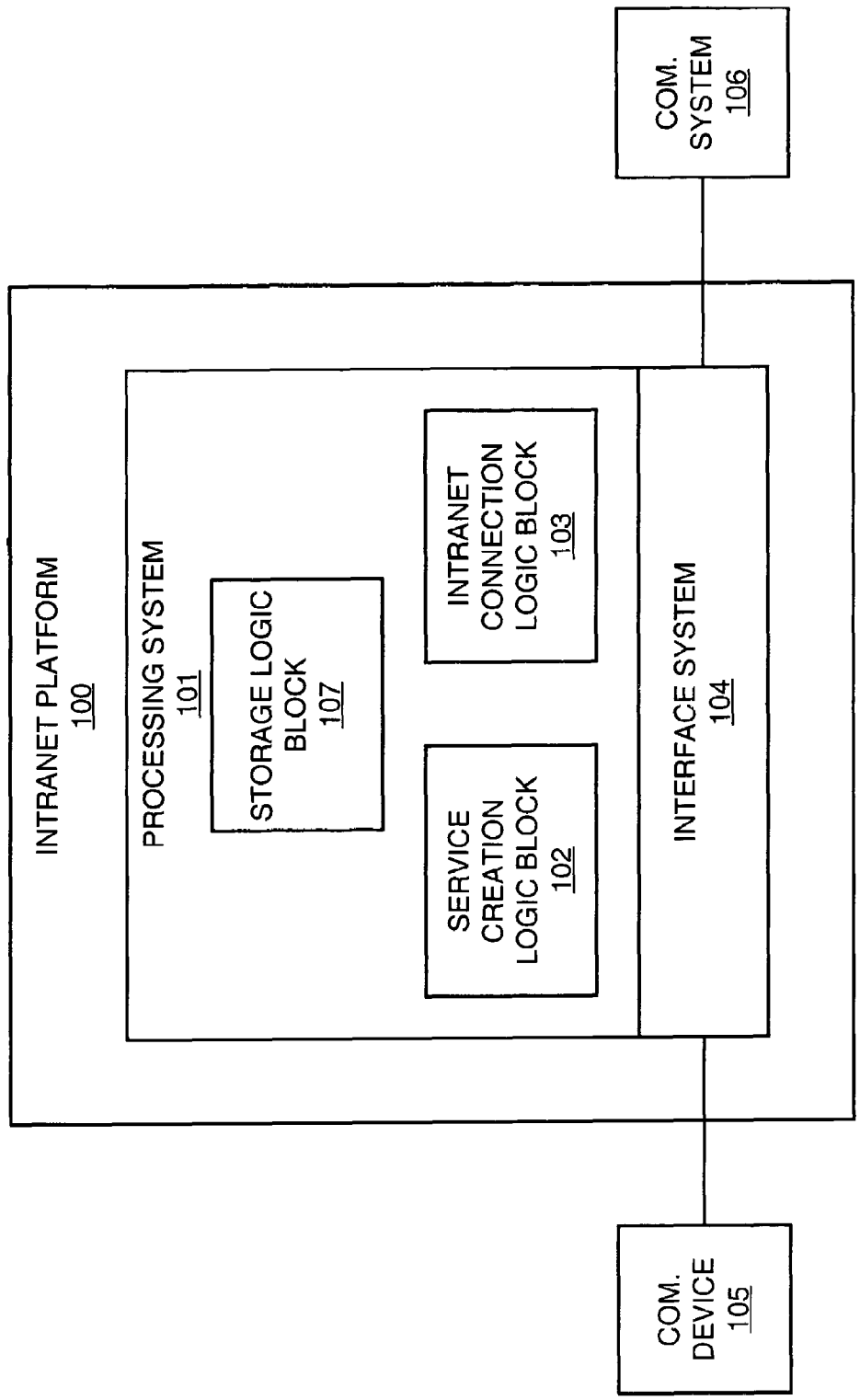
FIG. 1 illustrates an example of an intranet platform system according to the present invention.

Intranet Platform System FIG. 1:

FIG. 1 depicts an example of an intranet platform system 100 according to the present invention. The intranet platform system 100 is connected to a communication device 105 and a communication system 106. The intranet platform system 100 comprises a processing system 101 coupled to an interface system 104. The processing system 101 comprises a storage logic block 107, an intranet service creation logic block 102, and an intranet connection logic block 103.

The communication system 106 could be one or more wireline or wireless devices configured to provide intranet services. The communication system 106 could also be one or more communication networks that provide one or more communication services. For example, the communication system 106 could comprise the public switched telephone network ("PSTN") connected to an Internet Protocol ("IP")

network. In another example of the present invention, the communication system 106 could comprise an asynchronous transfer mode ("ATM") network connected to an IP network and/or the PSTN. In yet another example of the present invention, the communication system 106 could comprise a personal communication service ("PCS") network connected to an ATM network and/or the PSTN or other networks. Finally, the communication system 106 could be a Local Area Network ("LAN") connected to a Wide Area Network "(WAN"), that is interconnected with other WANs by a data network, such as an IP, Frame Relay or ATM network. Those skilled in the art will appreciate that the communication system 106 would include various conventional components not shown on FIG. 1 for clarity.

The processing system 101 could be any device or group of devices configured to process a request message for intranet access from a user at the communication device 105 in possession of a first intranet access card, to determine if an intranet configuration exists. If the intranet configuration exists, the processing system 101 processes the request message to connect the user to the intranet configuration over the communication system 106. If the processing system (101 determines the intranet configuration does not exist, the processing system 101 processes the request message to create the intranet configuration for the user and connects the user to the intranet configuration over the communication system 106. As will become apparent from the following description, the processing system 101 uses the storage logic block 107, the service creation logic block 102, and the intranet connection block 103 for configuration script execution to setup the intranet configuration for intranet connectivity. Those skilled in the art will appreciate that the request message could be a signaling message or a call request over a bearer channel.

The intranet configuration could be any connection or group of connections between one or more communication devices that provide intranet services. Some examples of the intranet services include without limitation, data access, programming interfaces, user publishing, search vehicles, and administration/management. Some examples of data access could be hosting of data in databases via generic or universal linking to allow users access to all database features. Some examples of search vehicles could be an internal indexing and search engine for the intranet environment. Some examples of programming interfaces could be a standard programming interface (API) which allows outside applications to interact with intranet and web data and vice versa. Some examples of user publishing could be dialogues via chat/news-group/bulletin board features as well as user posted content. Some examples of administration/management could be features for managing access, users, content and servers.

The interface system 104 could be any wireline or wireless device or group of devices configured to receive the request message for intranet access from the communication device 105. Although they are not shown for clarity, the interface system 104 could handle numerous links to other communication devices, e.g. 105, and communication systems, e.g. 106. In some examples of the present intranet platform system 100, the interface system 104 could exchange messages in various different protocols from communication devices both internal and external to the communication system 106. For example the interface system 104 could exchange SS7 TCAP messages, Transmission Control Protocol/Internet Protocol (TCP/IP), and/or Asynchronous Transfer Mode Protocol (ATM). Those skilled in the art will appreciate that the processing system 101 and the interface system 104 could include other conventional components not shown on FIG. 1 for clarity.

The communication device 105 could be any wireline or wireless device configured to interface with the intranet platform system 100. Some examples of the communication device 105 include without limitation, workstations, personal computers, notebook computers, cellular telephones, and personal data assistants as well as other devices capable of communicating with intranet and Internet devices.

Figure 2:
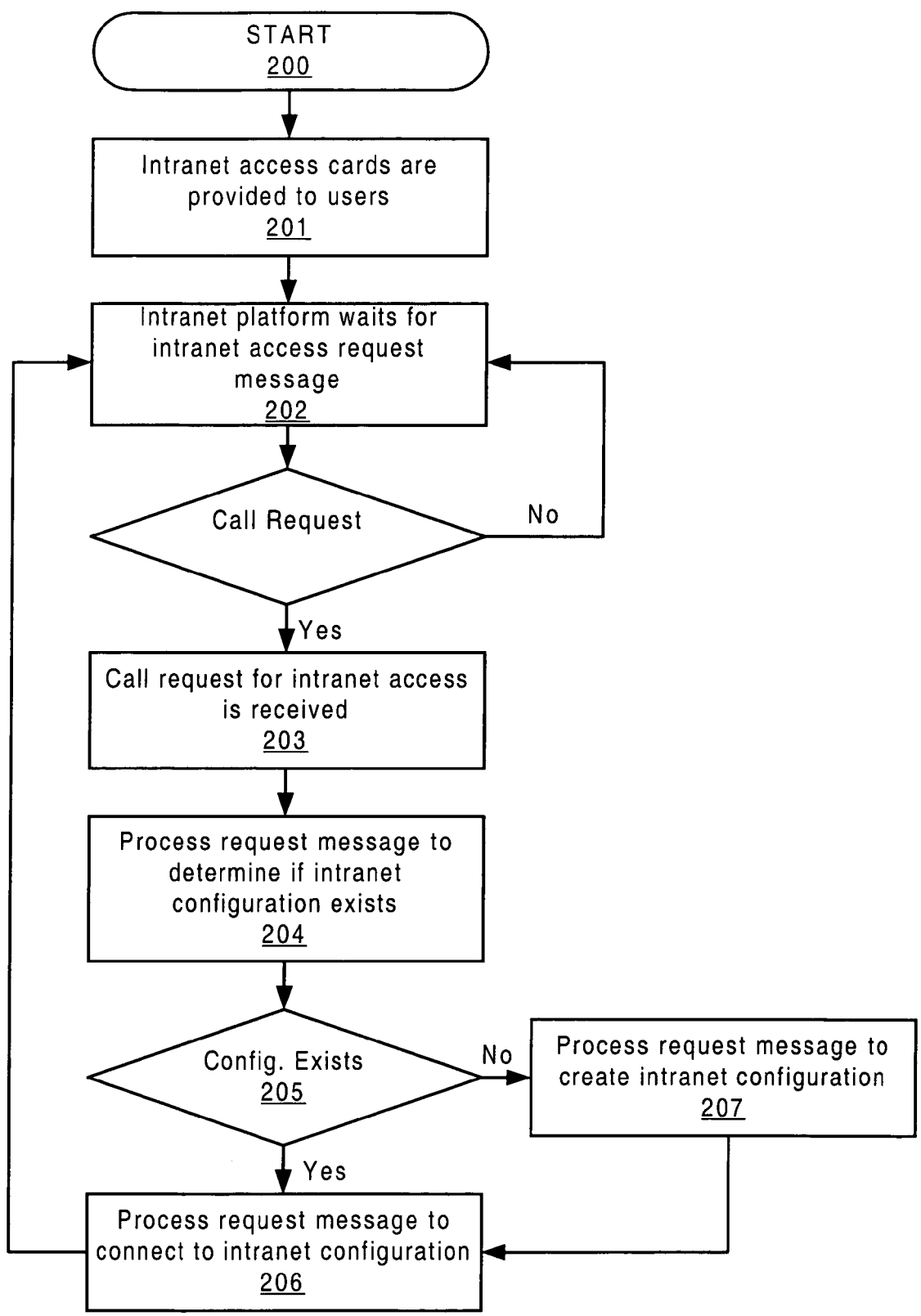
FIG. 2 is a flow chart illustrating an example of the operation of an intranet platform system according to the present invention.

Intranet Platform System Operation FIG. 2:

FIG. 2 is a flow chart illustrating an example of the operation of the intranet platform system 100 according to the present invention. It is anticipated however, that one skilled in the art will recognize numerous other examples in accordance with the principles described below, and thus, the following examples are for the purpose of illustration and not limitation. Those skilled in the art will also appreciate that various features described below could be combined with the above described embodiment to form multiple variations of the invention.

On FIG. 2 the operation begins at step 200. At step 201, intranet access cards are provided to users. The intranet access cards contain intranet access information for connecting to an intranet configuration using the intranet platform system 100. The intranet services provided by the intranet configuration depend on the configuration setup by the intranet platform system 100. The intranet services could include services that are pre-packaged or could include custom services selected by the cardholder. For example, a first group of intranet access cards could be provided to a first group of users that include intranet access information for an intranet configuration with specific services for the first user group. Thus, the first group of intranet access cards could provide access information to an intranet configuration that provides services such as, project monitoring, project updates, publication of regulatory manuals, and internal job postings. A second group of access cards could be provided to a second group of users that include intranet access information to a second intranet configuration with different services customized for the second group of users. For example, the second group of intranet access cards could provide access information to an intranet configuration that provides services such as, internal telephone books, distribution of custom-made software applications to employees and customers, distribution of training manuals and conference room scheduling.

The intranet access information could be any information that permits a user or group of users to access an intranet configuration. For example, the intranet access information could be a telephone number and access code. The telephone number could be specific to an individual intranet access card or could be a common telephone number, such as a toll free number, that is provided with a group of access cards. The access code could also be specific to an individual intranet access card or could be a common access code used to access a specific intranet configuration. The access code could be any combination of numeric or alphanumeric characters that identify a specific intranet configuration, or access card for the intranet configuration to the intranet platform system 100. The intranet access cards could be provided to an individual user or a group of users in any manner that conveys the intranet access information. For example, the intranet access cards could be physical cards provided over the counter at a merchant location or provided by a service provider. In another example, the intranet access cards could be virtual cards provided over the Internet via a file download or email account.

At step 202, the intranet platform system 100 waits for a request message for intranet access from a cardholder. At step 203 a request message for intranet access is received in the interface system 104 from a cardholder at the communication device 105. The request message includes the intranet access information from the intranet access card. At step 204, the processing system 101 uses the storage logic block 107 to process the request message to determine if an intranet configuration exists for the intranet access card. For example, the first time either an individual intranet access card or one of a group of intranet access cards is used to request access to an intranet configuration, the intranet platform system 100 identifies the request as a service creation request. The request message is then processed to create the intranet configuration according to the services associated with the intranet access card. All subsequent requests using that card are identified as service connection requests and processed to connect the cardholder to the associated intranet configuration. Thus, if an intranet configuration exists, at step 205, the request message is identified as a service connection request and the processing system 101 processes the request message using the intranet connection logic block 103 to connect the cardholder to the intranet configuration, at step 206. Similarly, if at step 205, an intranet configuration does not exist, the request message is identified as a service creation request and the processing system 101 processes the request message using the service creation logic block 102 to execute a service creation script at step 207. The service creation script creates the intranet connections over the communication system 106 to create an intranet configuration for the cardholder. At step 206, processing continues to connect the cardholder to the intranet configuration. Processing then continues at step 202, where the intranet platform system 100 waits for another request message for intranet access.

Figure 3:
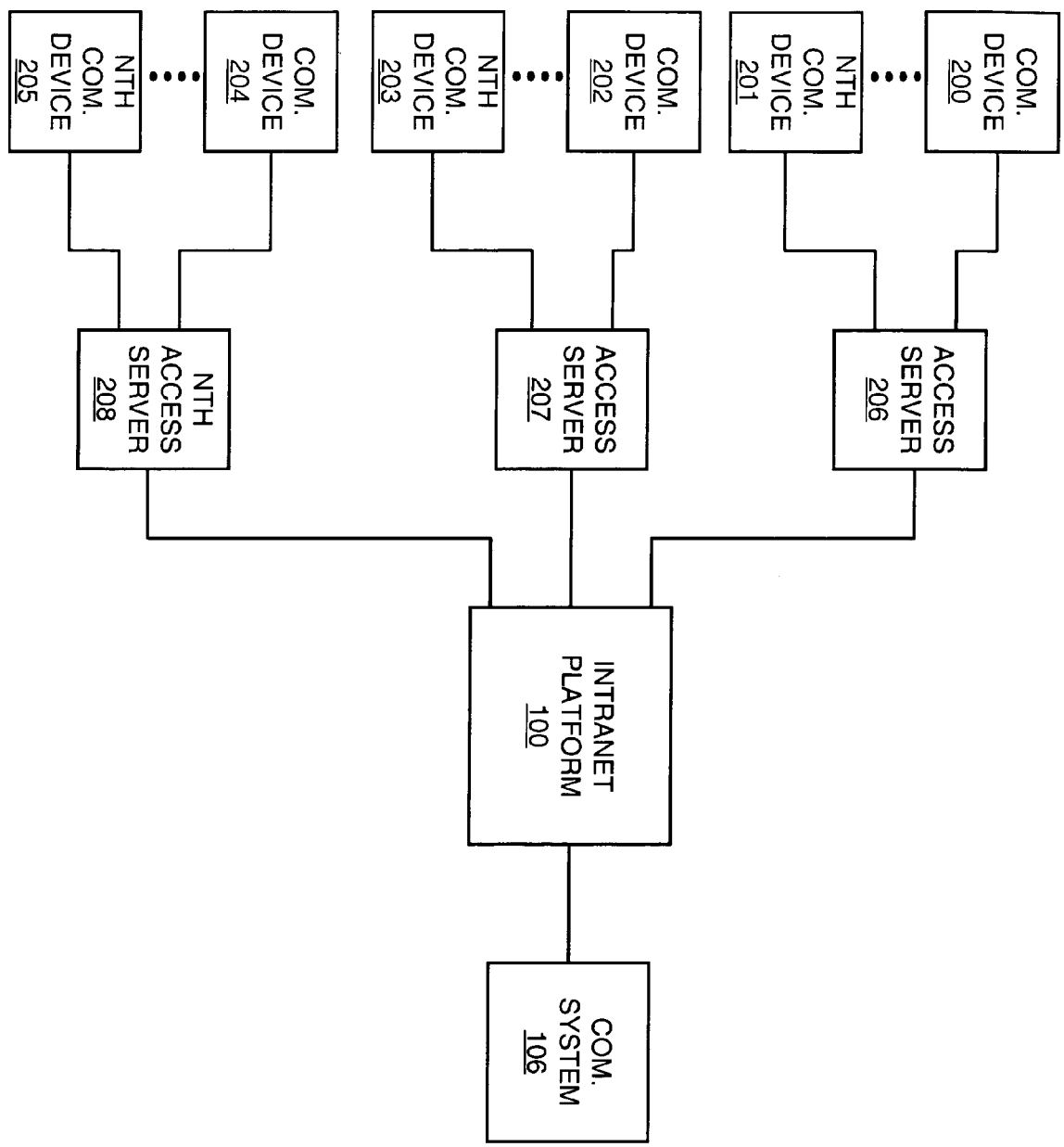
FIG. 3 is an example of a network architecture for an intranet platform system according to the present invention.
Figure 4:
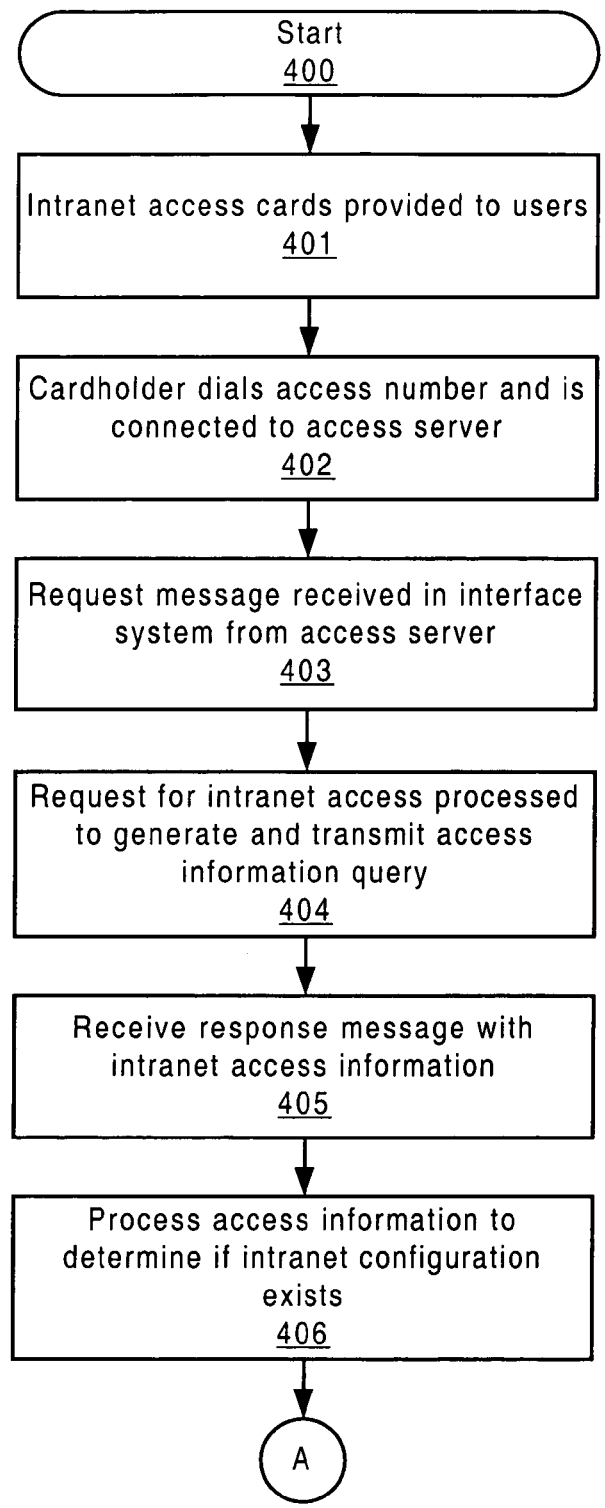
FIGS. 4 and 5 are a flow chart illustrating additional examples of the operation of an intranet platform system according to the present invention.
Figure 5:
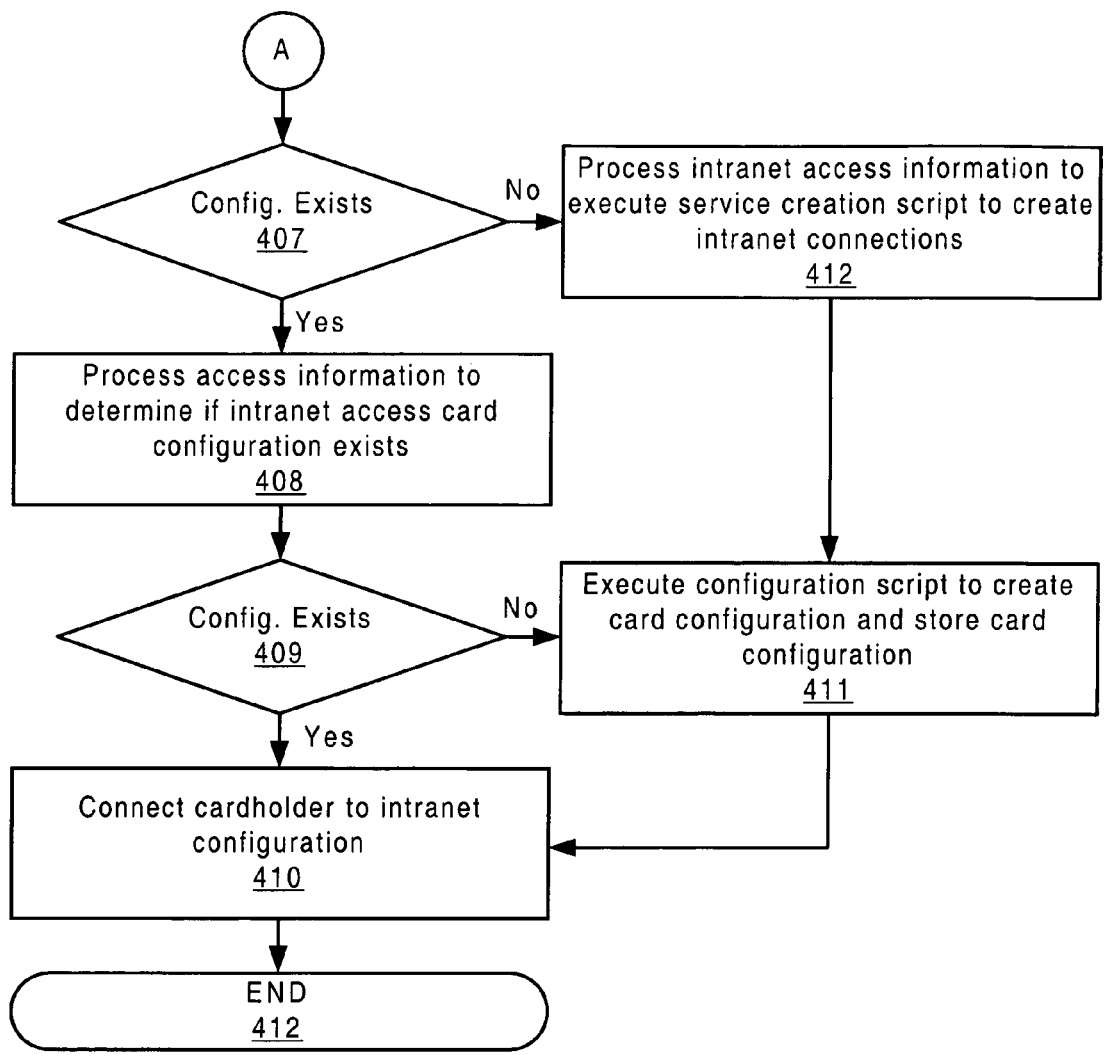

System Architecture and Operation: FIGS. 3–4:

FIG. 3 illustrates a network architecture for an intranet platform system 100 according to the present invention. FIG. 3 depicts the intranet platform system 100 connected to the communication system 106 and a first access server 206, a second access server 207 and an Nth access server 208. The first access server 206 is connected to a first communication device 200 and an Nth communication device 201. The second access server 207 is connected to a first communication device 202 and an Nth communication device 203, and the Nth access server 208 is connected to a first communication device 204 and an Nth communication device 205. In one example of the present invention, the access servers 206–208 could be conventional access servers configured to provide access to the Internet and the World Wide Web.

FIG. 4 depicts a flow chart illustrating additional examples of the operation of the intranet platform system 100 according to the present invention. The examples illustrated by FIG. 4 are described with respect to a cardholder at the communication device 200 connected to the access server 206. Those skilled in the art will appreciate that the intranet platform system 100 would operate in a similar manner with respect to the other communication devices, e.g. 202, and other access servers, e.g. 207.

On FIG. 4 the operation begins at step 400. At step 401 the intranet access cards are cards are provided to users. At step 402, a cardholder dials an access number using the communication device 200 and is connected to the access server 206. The access server 206 generates a request message for intranet access and transmits the request message to the intranet platform system 100. At step 403, the request message from the access server 206 is received in the interface system 104. At step 404, the processing system 101 processes the request message to generate a query message containing a request for the cardholder's access information provided on the intranet access card, and transmits the query message to the communication device 200 via the access server 206. At step 405, the intranet platform system 100 receives a response message from the communication device 200, via the access server 206, that includes the intranet access information. In an alternative example, the communication device 200 could provide the intranet access information during the original connection to the intranet platform system 100 via the access server 206.

At step 406, the intranet platform system 100 processes the access information to determine if an intranet configuration exists for the intranet access card. If the intranet configuration exists at step 407, the processing system 101 uses the storage logic block 107 to process the access information to determine if an intranet access card configuration exists for the intranet access card at step 408. In this example, the intranet access card configuration is created the first time an intranet access card is used to access an intranet configuration. The intranet access card configuration could be used to associate a specific intranet access card with the appropriate intranet configuration. The intranet access card configuration could also be used to configure the requesting communication device, e.g. 206, for faster access to an intranet configuration. The intranet access card configuration could also be used to monitor intranet usage, such as where the intranet services are sold on a time based system.

If the intranet access card configuration does not exist at step 409, the processing system 101 uses the service creation logic block 102 to execute an intranet card configuration script to create the intranet access card configuration at step 411. Upon creation of the intranet access card configuration, the intranet access card configuration is stored using the storage logic block 107 for future reference or access by the processing system 101. The storage logic block 107 could store the card configuration using an internal storage on the processing system 101 or using an external storage device. If the intranet access card configuration exists at step 409, the processing system 101 uses the intranet connection logic block 103 to connect the cardholder to the intranet configuration at step 410.

If the intranet configuration does not exist at step 407, the processing system 101 processes the intranet access information using the intranet service creation block 102 to execute a service creation script. The service creation script creates the intranet connections over the communication system 106 to provide the intranet services associated with the intranet access card. Also, if the intranet configuration does not exist at step 407, the processing system 101 recognizes that the intranet access card (or "member") configuration cannot exist. In this case the processing system 101 processes the intranet access information using the service creation logic block 102 to execute the intranet card configuration script, create the intranet access card configuration, and store the card configuration at step 411. Processing then continues at step 410, to connect the cardholder to the intranet configuration.

In some examples of the intranet platform system 100, the intranet configurations could be based on a pre-paid time period. In this case, the time period could be extended by purchasing additional intranet access cards or by routing a charge to a credit card account or corporate credit line. Advantageously, this permits the interface platform system 100 to provide temporary or permanent intranet services according to customer requirements.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

I claim:

1. A method for providing access to an intranet, the method comprising:
    providing intranet access cards to users, wherein the intranet access cards include intranet access information for intranet configurations;
    receiving a first request message for access to the intranet from a first requesting communication device employed by a first user who receives a first intranet access card;
    processing the first request message to determine if an intranet configuration providing access to intranet services exists, wherein first intranet access information for the intranet configuration is produced, and wherein the intranet configuration defines at least one connection employable by a plurality of the users between a plurality of intranet communication devices within the intranet;
    in response to determining the intranet configuration exists, processing the first intranet access information to connect the first requesting communication device of the first user to the intranet configuration to provide the intranet services associated with the first intranet access card to the first user, wherein the intranet services provided depend on the intranet configuration; and
    in response to determining the intranet configuration does not exist, processing the first intranet access information to execute a script to create the intranet configuration, to create a first card configuration for the first intranet access card, and to connect the first requesting communication device of the first user to the intranet configuration to provide the intranet services associated with the first intranet access card to the first user, wherein the intranet services provided depend on the intranet configuration;
    wherein the first card configuration associates the first intranet access card with the intranet configuration; and
    wherein the first card configuration comprises information for configuring the first requesting communication device of the first user for optimal access speed over the connection with the intranet configuration.

2. The method of claim 1 further comprising:
    in response to determining the intranet configuration exists, processing the first intranet access information to determine if the first card configuration exists; and
    in response to determining the first card configuration does not exist, processing the first intranet access information to create the first card configuration.

3. The method of claim 2 wherein processing the first request message to determine if the intranet configuration exists comprises:
    generating a first query message that includes a request for the first intranet access information provided with the first intranet access card;
    transmitting the first query message;
    receiving a first response message that includes the first intranet access information; and
    processing the first intranet access information to determine if the intranet configuration exists.

4. The method of claim 3 wherein processing the first intranet access information to execute a script to create the intranet configuration comprises:
    processing the first intranet access information to validate the first intranet access card.

5. The method of claim 4 wherein processing the first intranet access information to create the first card configuration comprises:
    in response to validating the first intranet access card, executing an intranet card configuration script to configure the first requesting communication device for access to the intranet configuration using the first intranet card; and
    storing the first card configuration.

6. The method of claim 1 further comprising:
    receiving a second request message for access to the intranet from a second user who receives a second intranet access card;
    processing the second request message to determine if a second card configuration exists for the second intranet access card, wherein second intranet access information for the intranet configuration is produced;
    in response to determining the second card configuration exists, connecting a second requesting communication device of the second user to the intranet configuration;
    in response to determining the second card configuration does not exist, processing the second intranet access information to create the second card configuration; and
    in response to creating the second card configuration, connecting the second requesting communication device of the second user to the intranet configuration.

7. The method of claim 6 wherein determining if the second card configuration exists comprises:
    generating a second query message that includes a request for the second intranet access information provided with the second intranet access card;
    providing the second query message;
    receiving a second response message that includes the second intranet access information; and
    processing the second intranet access information to determine if the second card configuration exists.

8. The method of claim 7 wherein processing the second intranet access information to create the second card configuration comprises:
    processing the second intranet access information to validate the second intranet access card; and
    in response to validating the second intranet access card, executing a second intranet card configuration script to configure the second requesting communication device for access to the intranet configuration using the second intranet access card; and
    storing the second card configuration.

9. An intranet platform system comprising:
    a processing system configured to process a first request message from a first requesting communication device employed by a first user having a first intranet access card to determine if an intranet configuration exists, wherein first intranet access information for an intranet configuration providing access to intranet services is produced, and wherein the intranet configuration defines at least one connection employable by a plurality of users between a plurality of intranet communication devices within the intranet, in response to determining the intranet configuration exists, process the first intranet access information to connect the first requesting communication device of the first user to the intranet configuration to provide the intranet services associated with the first intranet access card to the first user, wherein the intranet services provided depend on the intranet configuration, and in response to determining the intranet configuration does not exist, process the first intranet access information to execute a script to create the intranet configuration, to create a first card configuration for the first intranet access card, and to connect the first requesting communication device of the first user to the intranet configuration to provide the intranet services associated with the first intranet access card to the first user, wherein the intranet services provided depend on the intranet configuration; and an interface system coupled to the processing system and configured to receive the first request message for the processing system from the first requesting communication device of the first user;

wherein the first card configuration associates the first intranet access card with the intranet configuration; and wherein the first card configuration comprises information for configuring the first requesting communication device of the first user for optimal access speed over the connection with the intranet configuration.

10. The intranet platform system of claim 9 wherein in response to determining the intranet configuration exists, the processing system is configured to process the first intranet access information to determine if the first card configuration exists, and in response to determining the first card configuration does not exist, process the first intranet access information to create the first card configuration.

11. The intranet platform system of claim 10, wherein the processing system is configured to generate a first query message that includes a request for the first intranet access information provided with the first intranet access card, and process a first response message that includes the first intranet access information to determine if the intranet configuration exists; and wherein the interface system is configured to transmit the first query message and receive the first response message for the processing system.

12. The intranet platform system of claim 11 wherein the processing system is configured to process the first intranet access information to validate the first intranet access card.

13. The intranet platform system of claim 11 wherein the processing system is configured to execute an intranet card configuration script to configure the first requesting communication device for access to the intranet configuration using the first intranet access card, and store the first card configuration in response to validating the first intranet access card.

14. The intranet platform system of claim 9 wherein the processing system is configured to process a second request message to determine if a second card configuration exists for a second intranet access card, wherein second intranet access information for the intranet configuration is produced, in response to determining the second card configuration exists, connect a second requesting communication device of a second user to the intranet configuration, and in response to determining the second card configuration does not exist, process the second intranet access information to create the second card configuration and connect the second requesting communication device of the second user to the intranet configuration; and wherein the interface system is configured to receive the second request message for access to the intranet for the processing system.

15. The intranet platform system of claim 14 wherein the processing system is configured to generate a second query message that includes a request for the second intranet access information provided with the second intranet access card and process a second response message including the second intranet access information to determine if the second card configuration exists; and wherein the interface system is configured to transmit the second query message and receive the second response message for the processing system.

16. The intranet platform system of claim 15 wherein the processing system is configured to process the second intranet access information to validate the second intranet access card, and in response to validating the second intranet access card, execute a second intranet card configuration script to configure the second requesting communication device for access to the intranet configuration using the second intranet access card, and store the second card configuration.

17. A software product for use in operating an intranet platform system, the product comprising:

processing system instructions operational when executed by a processor to direct a processing system to process a first request message from a first requesting communication device employed by a first user having a first intranet access card to determine if an intranet configuration exists, wherein first intranet access information for an intranet configuration providing access to intranet services is produced, and wherein the intranet configuration defines at least one connection employable by a plurality of users between a plurality of intranet communication devices within the intranet, in response to determining the intranet configuration exists, processing the first intranet access information to connect the first requesting communication device of the first user to the intranet configuration to provide the intranet services associated with the first intranet access card to the first user, wherein the intranet services provided depend on the intranet configuration, and in response to determining the intranet configuration does not exist, processing the first intranet access information to execute a script to create the intranet configuration, to create a first card configuration for the first intranet access card, and to connect the first requesting communication device of the first user to the intranet configuration to provide the intranet services associated with the first intranet access card to the first user, wherein the intranet services provided depend on the intranet configuration;

interface system instructions operational when executed by the processor to direct an interface system to receive the first request message for access to the intranet from the first requesting communication device of the first user who receives a first intranet access card; and a storage medium operational to store the processing system instructions and the interface system instructions;

wherein the first card configuration associates the first intranet access card with the intranet configuration; and wherein the first card configuration comprises information for configuring the first requesting communication device of the first user for optimal access speed over the connection with the intranet configuration.

18. The product of claim 17 wherein in response to determining the intranet configuration exists, the processing system instructions are operational to process the first intranet access information to determine if the first card configuration exists, and in response to determining the first card configuration does not exist, process the first intranet access information to create the first card configuration.

19. The product of claim 18, wherein the processing system instructions are operational to generate a first query message that includes a request for the first intranet access information provided with the first intranet access card, and process a first response message that includes the first intranet access information to determine if the intranet configuration exists; and wherein the interface system instructions are operational to transmit the first query message and receive the first response message for the processing system.

20. The product of claim 19 wherein the processing system instructions are operational to process the first intranet access information to validate the first intranet access card.

21. The product of claim 19 wherein the processing system instructions are operational to execute a first intranet card configuration script to configure the first requesting communication device for access to the intranet configuration using the first intranet access card, and store the first card configuration in response to validating the first intranet access card.

22. The product of claim 17 wherein the processing system instructions are operational to process a second request message to determine if a second card configuration exists for a second intranet access card, wherein second intranet access information for the intranet configuration is produced, in response to determining the second card configuration exists, connect a second requesting communication device of a second user to the intranet configuration, and in response to determining the second card configuration does not exist, process the second intranet access information to create the second card configuration and connect the second requesting communication device of the second user to the intranet configuration; and wherein the interface system instructions are operational to receive the second request message for access to the intranet for the processing system.

23. The product of claim 22 wherein the processing system instructions are operational to generate a second query message that includes a request for the second intranet access information provided with the second intranet access card and process a second response message including the second intranet access information to determine if the second card configuration exists; and wherein the interface system instructions are operational to transmit the second query message and receive the second response message for the processing system.

24. The product of claim 23 wherein the processing system instructions are operational to process the second intranet access information to validate the second intranet access card and in response to validating the second intranet access card, execute a second intranet card configuration script to configure the second requesting communication device for access to the intranet configuration using the second intranet access card and store the second card configuration.

* * * * *